US007000439B2

(12) United States Patent
DiDomenico

(10) Patent No.: US 7,000,439 B2
(45) Date of Patent: Feb. 21, 2006

(54) APPENDAGE RESTRAINT SYSTEM

(76) Inventor: Dennis J. DiDomenico, 13420 Sam Furr Rd., Huntersville, NC (US) 28078-4003

(*) Notice: Subject to any disclaimer, the term of this patent is extended or adjusted under 35 U.S.C. 154(b) by 0 days.

(21) Appl. No.: 10/921,625

(22) Filed: Aug. 18, 2004

(65) Prior Publication Data
US 2005/0039499 A1 Feb. 24, 2005

Related U.S. Application Data

(60) Provisional application No. 60/496,217, filed on Aug. 18, 2003.

(51) Int. Cl.
E05B 75/00 (2006.01)
(52) U.S. Cl. .................. 70/16; 292/251.5; 128/846; 70/276; 70/18
(58) Field of Classification Search ............... 70/16, 70/276, 18; 128/846, 847, 869, 878, 879; 119/770, 771, 772, 816, 856, 857, 859; 292/251.5, 292/DIG. 71
See application file for complete search history.

(56) References Cited

U.S. PATENT DOCUMENTS

| 2,106,849 | A | * | 2/1938 | Long ..................... 340/304 |
| 3,545,237 | A | * | 12/1970 | Gardella, Jr. et al. ......... 70/16 |
| 4,089,195 | A | * | 5/1978 | Lai ............................ 70/16 |
| 4,351,169 | A |   | 9/1982 | Plymale |
| 4,652,028 | A | * | 3/1987 | Logan et al. .......... 292/251.5 |
| 4,720,128 | A | * | 1/1988 | Logan et al. .......... 292/251.5 |
| 4,813,745 | A | * | 3/1989 | Woody .................... 297/464 |
| 4,854,138 | A |   | 8/1989 | Charland |
| 4,972,784 | A | * | 11/1990 | Ing-Hsiang ................ 109/3 |
| 4,986,581 | A | * | 1/1991 | Geringer et al. ....... 292/251.5 |
| 5,016,929 | A | * | 5/1991 | Frolov ................... 292/251.5 |
| 5,184,855 | A | * | 2/1993 | Waltz et al. ........... 292/251.5 |
| 5,398,383 | A |   | 3/1995 | Bingold |
| 5,841,622 | A | * | 11/1998 | McNulty, Jr. ............. 361/232 |
| 6,135,515 | A | * | 10/2000 | Roth et al. ............ 292/251.5 |
| 6,260,892 | B1 | * | 7/2001 | Chang .................. 292/251.5 |
| 6,672,310 | B1 | * | 1/2004 | Streeter et al. ........... 128/869 |
| 6,718,984 | B1 | * | 4/2004 | O'Shea .................... 128/846 |
| 2004/0026933 | A1 | * | 2/2004 | Smith .................. 292/251.5 |
| 2004/0070187 | A1 |   | 4/2004 | Chen |
| 2004/0134247 | A1 | * | 7/2004 | Ernst et al. ................ 70/257 |

* cited by examiner

Primary Examiner—Suzanne Dino Barrett
(74) Attorney, Agent, or Firm—Tillman Ivsan, PLLC; Chad D. Tillman

(57) ABSTRACT

A restraint system for an appendage includes a clamp assembly and an electromagnet capable of being selectively activated for restraint. The clamp assembly includes a base portion and a restraint structure opposing the base portion. The restraint structure defines an opening for receiving an appendage between the base portion and the restraint structure. When the electromagnet is activated for restraint, the clamp assembly restrains an appendage extending in the opening. Another restraint system includes an inflatable bladder arrangement selectively activated to inflate to a first state and to deflate to a second state. When in the first state, the bladder arrangement defines an opening for passing of an appendage there through; however, when in the second state, the bladder arrangement defines an opening that precludes withdrawal of an appendage extending there through.

27 Claims, 7 Drawing Sheets

APPENDAGE RESTRAINT SYSTEM

CROSS-REFERENCE TO RELATED APPLICATIONS

The present application is a nonprovisional patent application of, and claims priority under 35 U.S.C. § 119(e) to, U.S. provisional patent application Ser. No. 60/496,217, filed Aug. 18, 2003, which provisional patent application is incorporated by reference herein. The present application also incorporates herein by reference Disclosure Document No. 525155 received by the OIPE of the USPTO on Jan. 31, 2003, which document has been referenced in the present file history by the applicant.

COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the Patent & Trademark Office file or records but, otherwise, all other copyright rights whatsoever are reserved.

BACKGROUND OF THE INVENTION

Occasionally it is necessary to restrain a person, especially one or more appendages such as the hands, in order for protection of the person or for insuring the security of another person. Handcuffs used by law enforcement agents is a well known appendage restraint device for the protection of the agents. Other similar restraint devices are disclosed, for example, in U.S. Pat. Nos. 4,854,138 and 5,398,383, both of which are hereby incorporated by reference herein. Military personnel also utilize appendage restraint devices for their protection when detaining persons of interest, especially when operating in foreign countries such as Iraq and Afghanistan.

Several safety concerns arise both for the person restrained and the person doing the restraining. In the context of law enforcement and military use, appendage restraint devices must be manually operated by the law enforcement agent or military personnel (hereinafter "Agent") in restraining an individual (hereinafter "Suspect"). This often requires that the Agent commit one or both hands to the task of restraining the Suspect and possibly requiring that the Agent shoulder a weapon or make some other security compromise. Such a compromise becomes of greater concern when there are more than one Suspect to be restrained, especially when there is only one Agent.

A appendage restraint device of the prior art is disclosed and claimed in U.S. Pat. No. 4,351,169 to Plymale, which disclosure is hereby incorporated by reference herein. In this disclosure, a base member is attachable to the surface of a police vehicle or any other stationary surface, and includes a plurality of arm members defining wrist openings for restraining the wrists of a criminal suspect while a search is performed. Tangs are included in the openings to make it more difficult for a criminal suspect to withdraw his hands without injuring his hands on the resistant tangs.

Unfortunately, the restraint devices of these patents have several disadvantages. For example, none of the restraints devices shown in these patents include the ability to initiate the restraining function by the Agent remotely; each requires that some security compromise be made by Agent, either in requiring the use of both hands of the Agent in restraining a Suspect and/or in requiring that the Agent come within arms-length to properly restrain, and insure restraint of, a Suspect.

With particular regard to the safety of the Suspect, the appendage restraint device of Plymale does not appear to include any safeguards for the safety of the Suspect, especially in view of the possibility that the policy vehicle, to which the Suspect is secured, could move or undergo an impact from another vehicle. Obviously, this would cause severe injury to the Suspect. The Suspect also readily may injure his hands by forcibly pulling against the tangs, especially if the Suspect is irrational or under the influence of a drug or alcohol, irrespective of whether the vehicle moves.

In view of the foregoing, it is clear that a need continues to exist for improvements in appendage restraint devices. This, and other needs, are addressed by one or more aspects of the present invention.

SUMMARY OF THE INVENTION

The present invention includes many aspects and features. Moreover, while many aspects and features relate to, and are described in, the context of the military and law enforcement use, the present invention is not limited to use only in military and law enforcement applications, as will become apparent from the following summaries and detailed descriptions of aspects, features, and preferred embodiments of the present invention. Thus, for example, the present invention may be utilized in healthcare services, especially in cases where a patient needs to be restrained.

Accordingly, one aspect of the present invention relates to an appendage restraint system. The restraint system preferably is for restraining a person's arm and, in particular, for restraining an area proximate the wrist of the person.

In accordance with this aspect, an exemplary system includes a clamp assembly and an electromagnet capable of being selectively activated for restraint. The clamp assembly includes a base portion and a restraint structure opposing the base portion. The restraint structure defines an opening for receiving an appendage between the base portion and the restraint structure. When the electromagnet is activated for restraint, the clamp assembly restrains an appendage extending in the opening.

Another exemplary system in accordance with this aspect includes an inflatable bladder arrangement selectively activated to inflate to a first state and to deflate to a second state. When in the first state, the bladder arrangement defines an opening for passing of an appendage there through; however, when in the second state, the bladder arrangement defines an opening that precludes withdrawal of an appendage extending there through.

Another aspect of the invention relates to a vehicle having a restraint system. for restraining a person adjacent an exterior area of the vehicle. Preferably, the restraint is mounted to an exterior of the vehicle. Furthermore, the restraint preferably includes two openings each for receiving there through a portion of an arm of a person, and each is operable to restrain an arm from withdrawing from the opening. The restraint of an arm preferably is independent of the restraint of the other arm, so that one arm can be restrained or released in controlled steps.

The vehicle includes a power source for powering of the restraint. The power source preferably includes an electrical source or a compressed fluid source.

In a feature of the aforementioned aspects of the invention, the restraint preferably is remotely operated. A remote control may be provided as a key chain, similar to well-known devices for unlocking and locking the doors of a car. In accordance with another aspect of the present invention, a method for securing a suspect to a vehicle by a person of authority includes the steps of mounting a restraint to a vehicle such that the arms of the suspect standing adjacent the vehicle may be engaged by the restraint, and remotely activating the restraint to engage the arms. The person of authority remotely activates the restraint from at least an arms-length distance from the first person. Activation of the restraint may be wirelessly initiated.

In addition to the aforementioned aspects and features of the present invention, it will be noted that the present invention further includes all combinations of such aspects and features. Such additional aspects and features will be apparent from detailed description of preferred embodiments of the present invention, as now described below.

BRIEF DESCRIPTION OF THE DRAWINGS

Aspects of the present invention, in conjunction with preferred embodiments, will now be described in detail with reference to the accompanying drawings, wherein the same elements are referred to with the same reference numerals, and wherein.

DETAILED DESCRIPTION

As a preliminary matter, it will readily be understood by those persons skilled in the art that the present invention is susceptible of broad utility and application in view of the following detailed description of preferred embodiments. Furthermore, many embodiments as well as adaptations, variations, modifications, and equivalent arrangements, will be apparent from or reasonably suggested by the preferred embodiments described herein without departing from the scope of the present invention. Accordingly, while the present invention is described herein in detail in relation to preferred embodiments, it is to be understood that this disclosure is illustrative and exemplary and is made merely for purposes of providing a full and enabling disclosure of the present invention. The disclosure herein is not intended, nor is to be construed, to limit the scope of the present invention, which is defined by the claims and the equivalents thereof.

Figure 1:
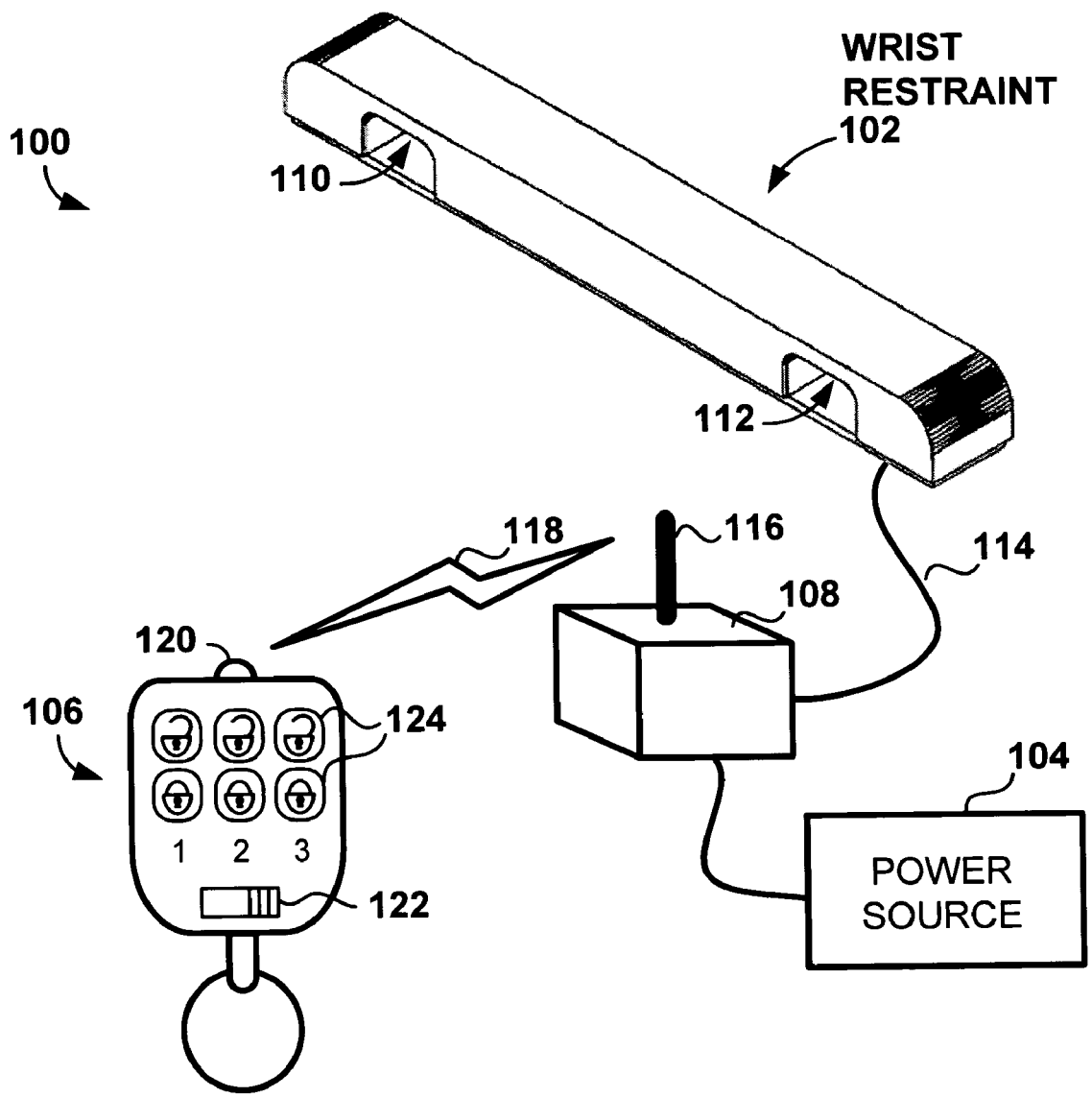
FIG. 1 illustrates a preferred embodiment of an appendage restraint system in accordance with one or more aspects of the present invention.

Turning now to FIG. 1, a preferred embodiment of an appendage restraint system 100 of the present invention is illustrated. The restraint system 100 includes wrist restraint 102, power source 104, transmitter 106, and receiver 108. The wrist restraint 102 is shown in the closed position and defines two openings 110,112 through which a person's arms, if extended therein when the wrist restraint 102 was closed, would be restrained at the wrists.

The wrist restraint is powered by power source 104. As described in further detail herein, power source 104 may comprise an electrical power source, such as a battery/alternator of a motor vehicle, or a compressed fluid source, such as a compressed fluid reservoir.

Activation of the wrist restraint 102 to the closed position and to the open position is controlled by receiver 108, which controls the application of the power through cabling 114 to the wrist restraint 102 from the power source 104. Receiver 108 includes antennae 116 for receiving control signals 118 from a wireless transmitter 106 via port 120. Transmitter 106 further includes a lockout button 122, which, when in the locked position, prevents the accidental transmission of a control signal 118, receiver 108, and an array of buttons 124 which is shown as forming part of a keychain with a keyring or receiver for a lanyard and the like (not shown). Transmitter 106 includes an array of buttons 124, with actuation of a button on the upper row causing a wrist restraint to activate to an open position, and with actuation of a button on the lower row causing a wrist restraint to activate to a closed position. As will be evident, transmitter 106 includes the capability to control three separate restraints, such as the restraints 702,704,706 that are shown as part of the law enforcement vehicle in FIG. 7.

Figure 2:
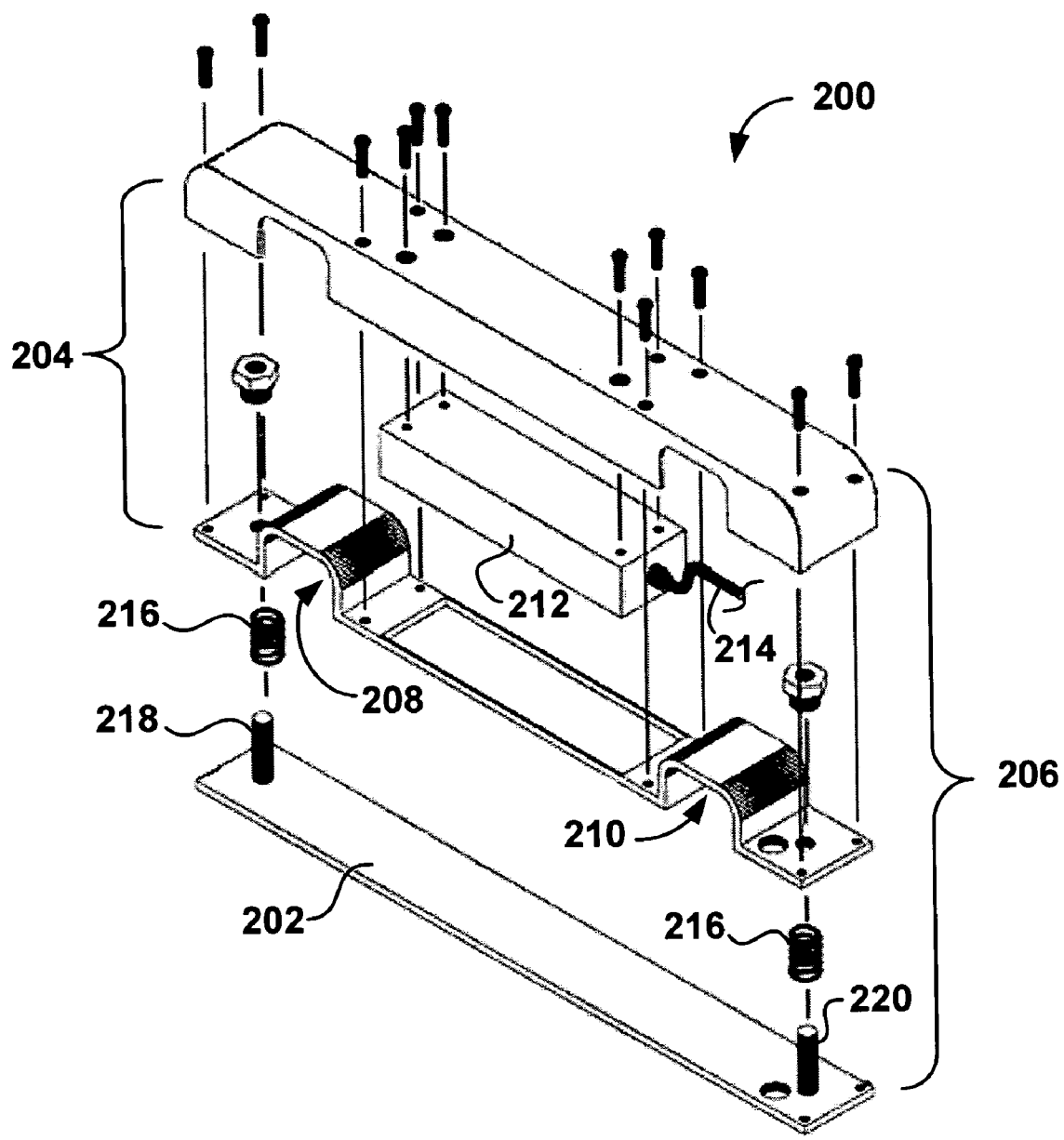
FIG. 2 is an exploded perspective view of a preferred embodiment of an appendage restraint system in accordance with one or more aspects of the present invention.

Another preferred embodiment of an appendage restraint system 200 of the present invention is illustrated in FIG. 2. This restraint system is shown in exploded view and, as shown, includes a base portion 202 and a restraint structure 204 that, together, define a clamp assembly 206. The restraint structure 204 opposes the base portion 202 and defines openings 208,210 each for receiving a wrist between the base portion 202 and the restraint structure 204. An electromagnet 212, when activated, provides a magnetic field that forcibly biases the restraint structure 204 toward the base portion 202 to restrain any wrist disposed within the openings 208,210. The electromagnet 212 is powered by way of cabling 214, which preferably connects with an electrical power source. The electromagnet preferably provides up to thirteen-hundred pounds of force, thereby effectively precluding a person from pulling the restraint structure 204 away from the base portion 202 when the electromagnet is activated for restraint.

The restraint system 200 also includes elastic elements, illustrated as metallic coil springs 216, though other examples of suitable elastic elements are within the scope of the invention. These elastic elements 216 bias the restraint structure 204 away from the base portion 202 to allow the clamp assembly 206 to receive and release an appendage. Again, though, when the electromagnet 212 is activated for restraint, it provides a magnetic force that exceeds the spring force provided by the elastic elements 216 such that any received appendage is restrained by the downward pressure of the restraint structure 204 driven by the electromagnet 212.

As will be appreciated from examination of the exploded view, the restraint structure 204 is movable between a position proximal the base portion 202 for restraint of a person's arms preferably at the wrists, and a position distal the base portion 202 for passage of a person's hands through openings 208,210. In this regard, each of the openings 208,210 is minimized to restrain an appendage when the restraint structure 204 is in the proximal position and is maximized to receive and release an appendage when the restraint structure 204 is in the distal position. In moving between these positions, the restraint structure 204 is guided along posts 218,220 that are fixed to the base portion 202. When activated for restraint, the electromagnet preferably applies thirteen-hundred pounds of holding force.

Figure 3:
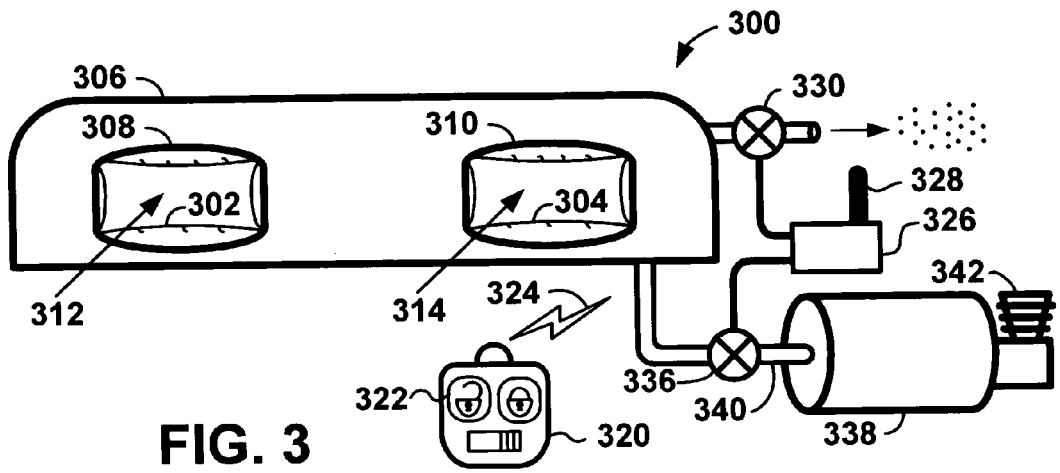
FIGS. 3–5 are illustrations of another preferred embodiment of an appendage restraint system in accordance with one or more aspects of the present invention.
Figure 4:
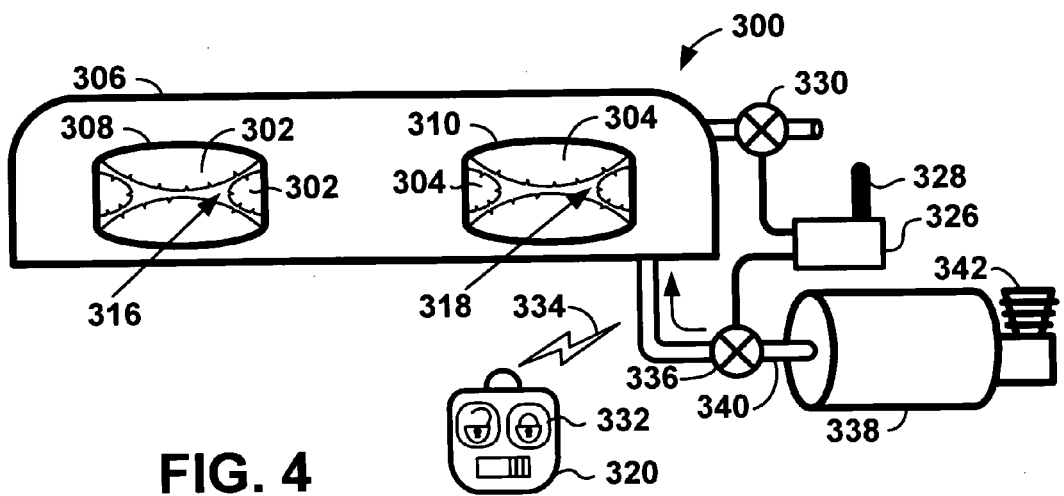
Figure 5:
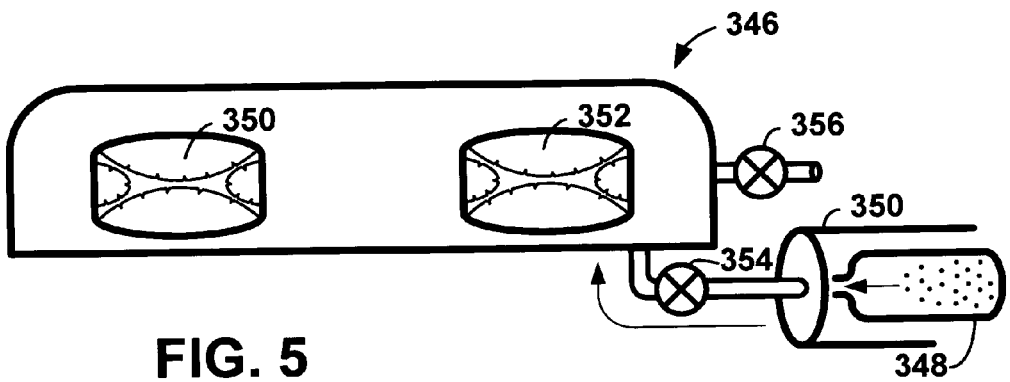

Yet another preferred embodiment of a restraint system 300 of the present invention is illustrated in FIGS. 3–4. The restraint system 300 includes an arrangement of one or more inflatable bladder members 302,304. A mounting structure 306 houses the bladder arrangement and defines openings 308,310 for passage therethrough of an appendage such as a hand. In FIG. 3, the bladder members are deflated to a state defining openings 312,314 for receiving and releasing an appendage. The openings 312,314 are dimensioned to allow passage of a hand therethrough according to the illustrated embodiment of a wrist and arm restraint system 300 though other embodiments of restraint systems for other joints and appendages are within the scope of the present invention. In FIG. 4, the bladder members are selectively activated to inflation at a state defining openings 316,318 for restraining an appendage from being withdrawn. The openings 316,318 are illustrated as diminished in size compared to openings 312,314 due to inflation of the bladder members 302,304. Thus, with placement of a wrist or a portion of an arm through the openings of the housing 308,310, withdrawal is allowed in FIG. 3. In FIG. 4, however, withdrawal of the arm is prevented due to restraining forces applied to the wrist or arm by the inflated bladders. As the restraining forces are derived from the pressures within the bladders, an arm is restrained forcibly but safely. As restraining forces vary in part with the product of the pressure within a bladder member (pounds per squared inch) and the total area (squared inches) of contact between an appendage and the bladder member, a detainee of relatively large stature and likely considerable strength experiences elevated restraining forces due to elevated contact area of the pressurized bladder with relatively large appendages. Thus an established operating pressure for inflation and restraint safely but forcibly restrains appendages and detainees of various sizes and strength.

Bladder members are preferably of pliable, durable, puncture resistant and fluid-tight constructions. For example a multi-layer construction having a durable tear-resistant outer layer of woven fabric and an inner layer of stretchable air tight material such as rubber or vinyl supported by the outer layer is suitable. A woven fabric outer layer utilizing commercially available carbon fiber textile provides strength and a frictional surface conforming the shape of an appendage for gripping the appendage when the bladder member is inflated.

A controller for remotely controlling the state of the bladder members, preferably a wireless transmitter 320, is utilized by a user of the restraint system such as a law enforcement or military officer. In FIG. 3, upon actuation of a release button 322, a control signal 324 is sent by the controller to the restraint system 300. In the illustrated embodiment, a control mechanism 326 receives the signal 324 by way of an antenna 328 or other signal sensitive device. The wireless control signal 324 can be a radio-frequency (RF) signal or infra-red (IR) signal within the illustrated embodiment of the invention. In other embodiments, a controller sends a signal to a control mechanism by way of a cabled connection.

Upon receipt of the control signal 324, the control mechanism 326 actuates a release valve 330 to allow escape of gas or fluid from the bladder members to deflate to the state of FIG. 3. The gas or fluid from the bladder members are either released to the environment or recycled by the restraint system through a closed network of lines and valves or any suitable manifold (not illustrated). The release valve 300 optionally automatically vents fluid from the bladder members if a threshold pressure is exceeded in order to prevent injury to a restrained appendage.

In FIG. 4, upon actuation of a restrain button 332, a control signal 334 is sent by the controller to the restraint system 300. Upon receipt of the control signal 334, the control mechanism 326 closes the release valve 330 and actuates a supply valve 336 that controls the supply of pressurized fluid from a compressed fluid container 338 through a supply line 340. Thus, a user activates the bladder arrangement to inflate to a state as illustrated in FIG. 4 to restrain an appendage. for example that of a detainee, by depressing the restrain button 332. In the illustrated embodiment of FIGS. 3 and 4, a motorized compressor 342 is coupled to the compressed fluid container 338 and automatically maintains fluid pressure therein. The fluid within the container 338 and utilized to inflate the bladder members is optionally a gas or liquid such as air or hydraulic oil within the scope of the invention.

In an alternative embodiment of a restraint system 346, an alternative compressed fluid container 348 is utilized to inflate the bladder members 350,352. A disposable one-time use compressed fluid cartridge 348 is disposed within a housing 350. The cartridge 348 is coupled to the bladder members through a supply valve 354 actuated to inflate the members for restraint of an appendage. The members are deflated by actuation of the release valve 356. Suitable controlling elements, such as control mechanism 326 and controller 320 of FIGS. 3–4, for controlling the valves 354,356 are within the scope of the restraint system 346.

One embodiment of a restraint system utilizes multiple compressed fluid cartridges within housing for activating multiple restraint units for restraining multiple detainees. In another embodiment of a restraint system, multiple compressed fluid cartridges are utilized to repeatedly using a single restraint unit.

Figure 6:
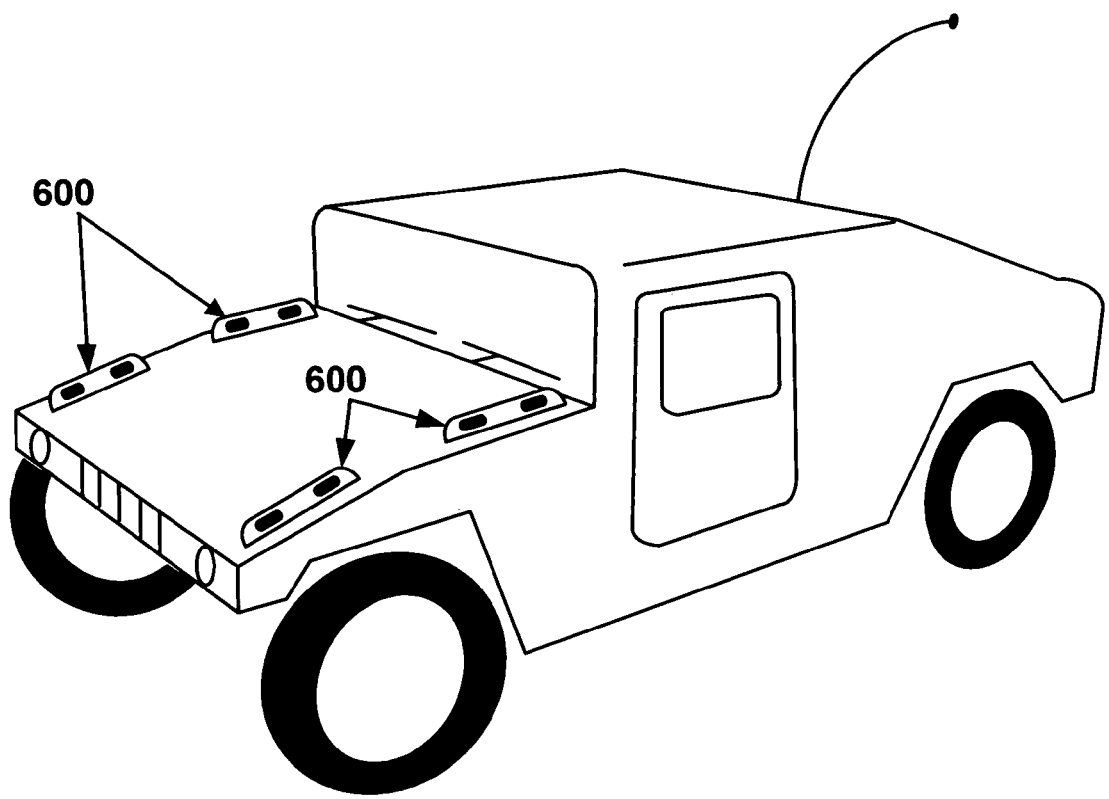
FIG. 6 is a perspective view of a military vehicle having appendage restraint systems in accordance with one or more aspects of the present invention.
Figure 7:
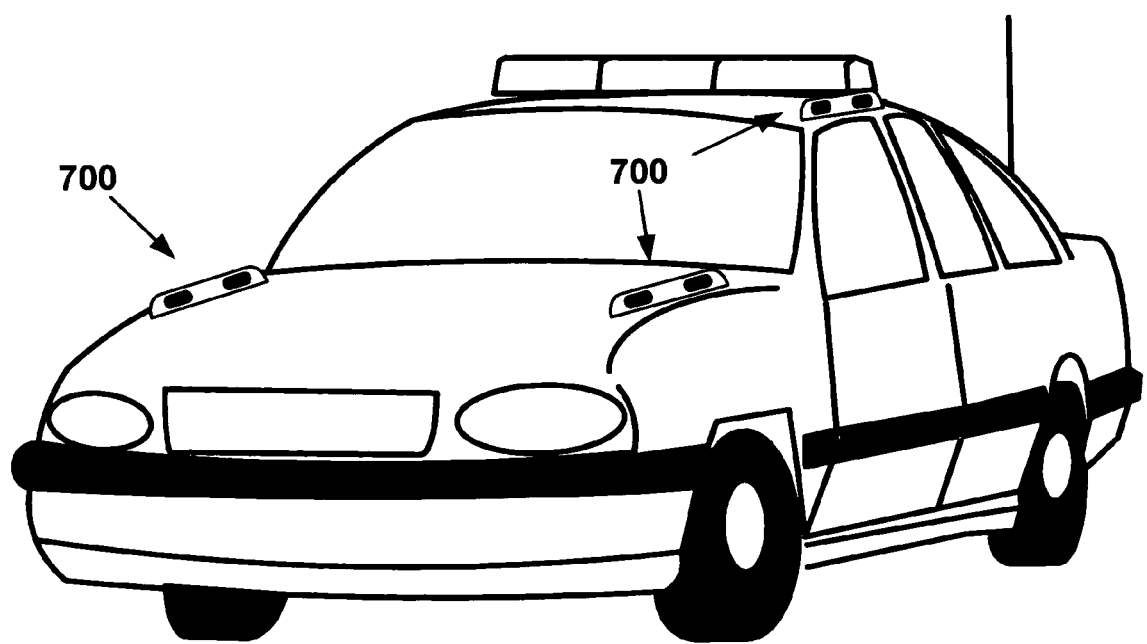
FIG. 7 a perspective view of a law enforcement vehicle having appendage restraint systems in accordance with one or more aspects of the present invention.

The restraint system in accordance with an aspect of the present invention can be mounted to a vehicle. In this aspect of the present invention, the restraint can be mounted in strategic areas of the vehicle, such as the hood, trunk, roof, or fender. This insures that a Suspect cannot flee from an Agent, as can be done if only handcuffs, for example, are utilized. FIG. 6 illustrates the mounting of four restraints 600 to the fenders of a HUM-V military Vehicle, such as those used in Afghanistan and Iraq. FIG. 7 illustrates the mounting of three restraints 700 to the fenders and roof of a law enforcement vehicle, such as a police vehicle. As will be appreciated, a transmitter used, for example, in conjunction with the vehicle of FIG. 7, preferably includes three sets of buttons, each set being for selective operation of a particular one of the restraints.

In order to address the safety of a Suspect secured to a vehicle in accordance with this aspect of the present invention, and avoid possible liability resulting from injury to the Suspect, one or more safeguards preferably are included that lessen the risk that a Suspect will be secured to the vehicle during movement of the vehicle.

Thus, for example, in various features of preferred embodiments, a restraint is (or becomes) inoperable while the motor is running; a restraint is (or becomes) inoperable if the emergency brake of the vehicle is not engaged; and/or a restraint is (or becomes) inoperable if the vehicle is in gear. Additionally, while a preferred embodiment of a clamp assembly of the restraint system of FIG. 2 may secured to a surface by bolting, as suggested by FIG. 2, it is also contemplated within the scope of the present invention that a preferred restraint be secured in a removable manner for automated, quick release in the event that the vehicle undergoes motion or impact. In this regard, sensors are well-known that detect impacts and immediately deploy airbags; preferably such a sensor is used in this aspect of the present invention to provide a failsafe that immediately dismount the restraint to which a Suspect is engaged upon the movement of the vehicle. The mounting in such case may be through electromagnets that secure the base assembly to the vehicle's surface; or through any automatic, quick-release mechanical coupling. In any event, the time for effecting release should be only a fraction of a second upon the detection of vehicular movement by the sensor.

Figure 8:
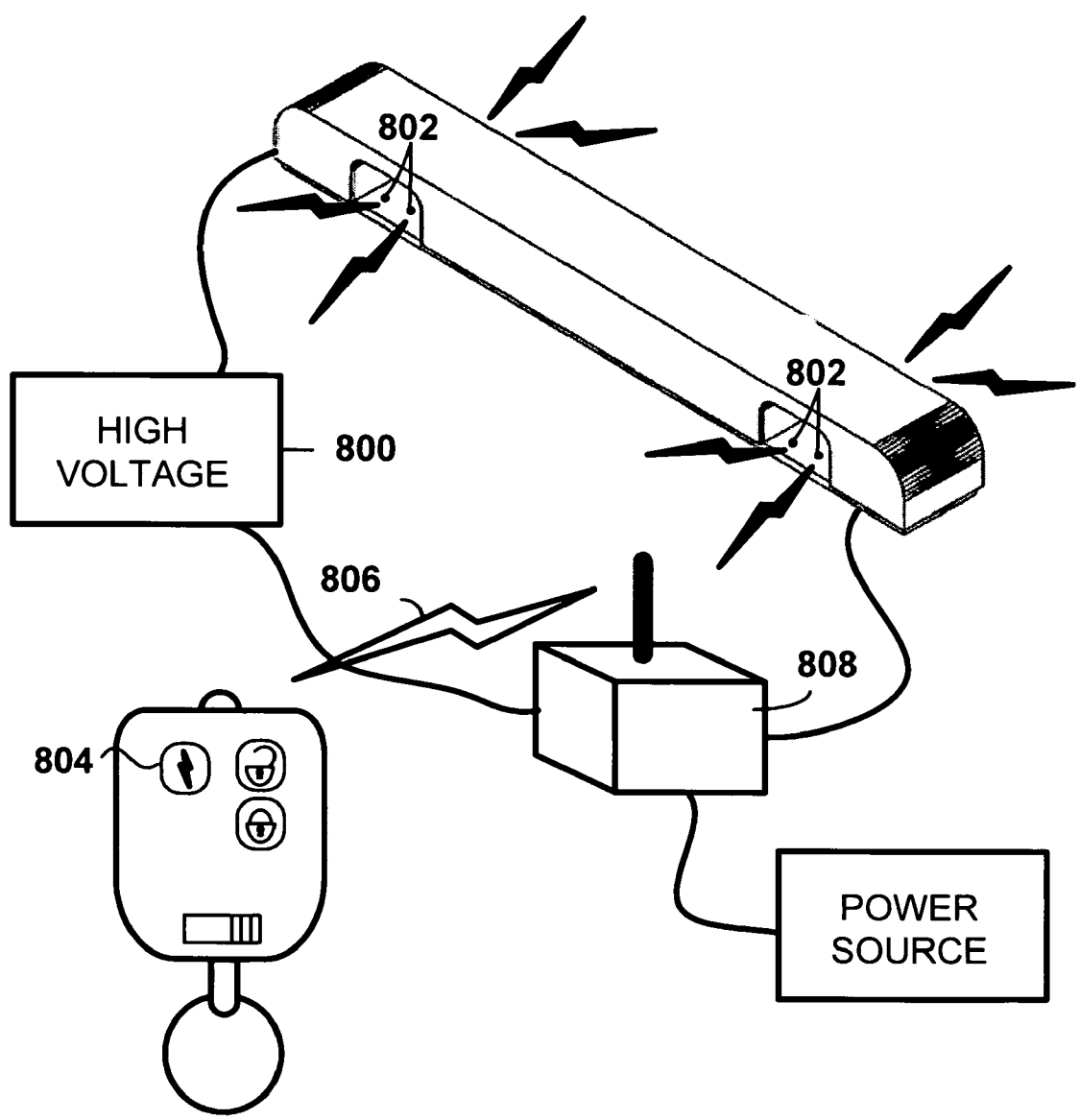
FIG. 8 illustrates a preferred embodiment of an appendage restraint system including an electric stun feature in accordance with one or more aspects of the present invention.

In accordance with yet an additional feature of the present invention, an appendage restraint system includes the capability to subdue or stun a person who is restrained with pulses of high voltage electricity. The electric shock is supplied from a separate power source of high voltage current to electrical contacts exposed for abutting engagement with restrained appendages. FIG. 8 illustrates this feature, wherein high voltage power source 800 supplies a high voltage electrical current to electrical contacts 802. The electric shock is triggered when button 804 on the wireless transmitter is depressed, causing control signal 806 to be transmitted to control mechanism 808 controlling high voltage power source 800.

Figure 9:
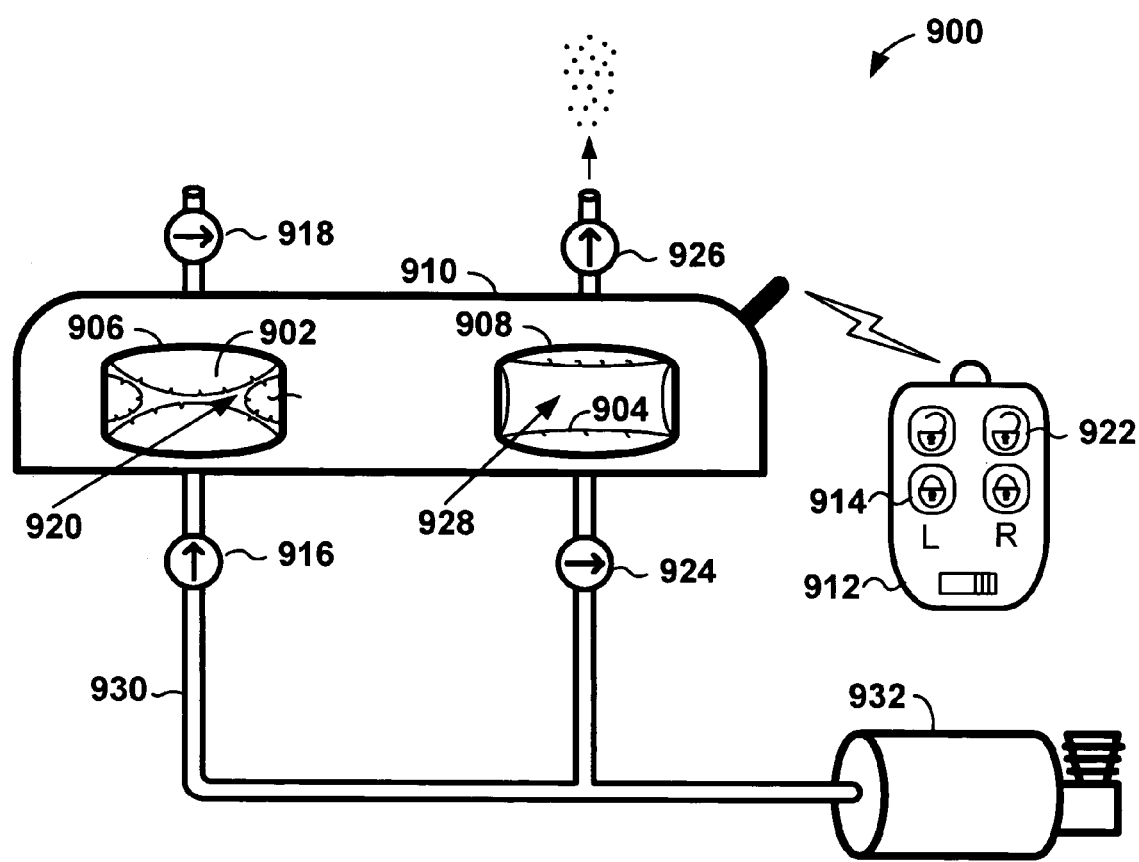
FIG. 9 illustrates another preferred embodiment of a double appendage restraint system having dual control in accordance with one or more aspects of the present invention.

An embodiment of a double appendage restraint system having dual independent control capability according to one or more aspects of the present invention is illustrated in FIG. 9. A double appendage restraint system 900 includes an arrangement of separately inflatable bladder members 902, 904 for allowing and restricting passage of an appendage through respective openings 906,908 defined in a mounting structure 910. A controller 912 for remotely and separately controlling the state of each bladder member communicates wirelessly with a control mechanism (not illustrated in FIG. 9) within the housing of the mounting structure. The controller includes both a release button and a restrain button for each of left bladder member 902 and right bladder member 904 for separately controlling the states of the bladder members 902,904.

Upon actuation of the restrain button 914, the left bladder member 902 is inflated to a state to restrain an appendage by way of the opening of the supply valve 916 and the closing of the release valve 918 each dedicated to regulating the state of inflation of the left bladder member. A diminished opening 920 is defined by the state of the left bladder member for restraining an appendage extended through the opening 906. A fluid line manifold 930 delivers pressurized fluid from a compressed fluid container 932 to the supply valves 916,924.

Upon actuation of the release button 922, the right bladder member 904 is deflated to a state to allow the passage and release of an appendage through the opening 908. The right bladder member is deflated by way of the closing of a supply valve 924 and the opening of the release valve 926 each dedicated to regulating the state of inflation of the right bladder member. An unobstructed opening 928 is defined by the right bladder member 904 that allows the passage and release of an appendage such as a hand, wrist, or arm.

Thus the system 900, with the bladder members 902, 904 inflated to respective states as illustrated in FIG. 9, is capable of restraining a first appendage, such as the left arm of a detainee, in the left opening 906 while a second appendage, such as the right arm of the detainee, can be freely extended through and released from the opening 908. This advantage of dual independent control capability with regard to restraining multiple appendages or detainees provides a degree of safety to a user of the system such as a law enforcement or military officer.

In an exemplary scenario utilizing the system 900 of FIG. 9, a detainee is instructed by the officer to face the restraint system and place left and right hands through respective openings in the mounting structure of the system. Once the detainee has complied with the order, the officer actuates a left restrain button and a right restrain button restraining each of the detainees arms. This is accomplished while the officer is positioned at a safe distance from the detainee. The officer then steps closer to the back of the restrained detainee and performs a search of the person and effects of the detainee. The officer then actuates the right release button to release the right arm of the detainee and instructs the detainee to extend rearward the released arm and places a conventional handcuff on the wrist of the released arm. The officer then actuates the left release button, instructs the detainee, and places the left arm in a handcuff. An otherwise dangerous and awkward operation of searching and handcuffing a suspect is completed by a single officer who securely and safely controls the detainee utilizing the restraint system. The advantage is both very real and perceived. A potentially violent detainee, who might otherwise choose to assault the officer or attempt escape as the officer concentrates on searching, does not perceive a moment of opportunity for action and is thereby discouraged from any attempt at escape or attacking the officer. Similarly, an officer dispatched to an ongoing crime situation can quickly and safely arrest a first detainee by utilizing the restraint system and then proceed to other nearby activities related to the ongoing situation confident that the first detainee is restrained and cannot re-enter a fray.

The present invention has been described in relation to particular embodiments which are intended in all respects to be illustrative rather than restrictive. Alternative embodiments will become apparent to those skilled in the art to which the present invention pertains without departing from its spirit and scope. Furthermore, any sequence(s) and/or temporal order of steps of various processes described herein are those considered to be the best mode contemplated for carrying out the present invention. Thus, it should be understood that, although steps of various processes may be shown and described as being in a preferred sequence or temporal order, the steps of any such processes are not limited to being carried out in any particular sequence or order, absent a specific indication of such to achieve a particular intended result. Indeed, the steps in such processes generally may be carried out in various different sequences and orders while still falling within the scope of the present invention. Accordingly, the scope of the present invention is defined by the appended claims rather than the foregoing description.

Thus, for example, it should be appreciated that, within the scope of the present invention, a appendage restraint system in accordance with one or more aspects of the present invention may include only a single wrist restraint, and that two such restraints may be provided for restraining both hands of a Suspect. Moreover, the remote release of a restrained appendage by an Agent may be performed for two appendages in parallel (simultaneously) or in series (one-after-the-other) in order to maintain better control of the situation by the Agent.

What is claimed is:

1. A restraint system for receiving and subsequently selectively releasing and restraining an appendage, said restraint system comprising:
   (a) a clamp assembly including,
      (i) a base portion,
      (ii) a restraint structure opposing said base portion defining an opening for receiving an appendage between said base portion and said restraint structure, and
   (b) an electromagnet capable of being selectively activated for restraint,
   (c) wherein, when said electromagnet is not activated for restraint, said clamp assembly receives and releases an appendage,
   (d) wherein, when said electromagnet is activated for restraint, said clamp assembly restrains an appendage, and
   (e) wherein said restraint system further comprises an elastic element, wherein, when said electromagnet is not activated for restraint, said clamp assembly is biased by said elastic element to receive and release said appendage.

2. The restraint system of claim 1, wherein said elastic element biases said restraint structure away from said base portion.

3. The restraint system of claim 2, wherein said elastic element comprises a spring.

4. The restraint system of claim 1, wherein said restraint structure is movable between a position proximal said base portion and a position distal said base portion, wherein said opening is minimized when said restraint structure is at said proximal position, and wherein said opening is maximized when said restraint structure is at said distal position.

5. The restraint system of claim 4, said clamp assembly further comprising a post along which said restraint structure is movable between said proximal position and said distal position.

6. The restraint system of claim 4, wherein said electromagnet, when activated for restraint, biases said restraint structure toward said proximal position.

7. The restraint system of claim 1, wherein said restraint structure defines a U-channel opening toward said base portion for receiving a portion of the appendage.

8. The restraint system of claim 1, wherein said U-channel is dimensioned to receive a wrist.

9. The restraint system of claim 1, wherein said restraint structure opposes said base portion and defines a pair of openings each for receiving a portion of an appendage between said base portion and said restraint structure.

10. The restraint system of claim 1, said restraint structure comprising:
    (i) a first channel structure opening toward said base portion for receiving a portion of a first appendage,
    (ii) a second channel structure opening toward said base portion for receiving a portion of a second appendage, and
    (iii) a center section extending between and connecting said first channel structure and said second channel structure.

11. The restraint system of claim 10, wherein said electromagnet is connected to a cover of said restraint structure.

12. The restraint system of claim 10, said clamp assembly further comprising a plurality of posts fixed to said base portion and passing through said restraint structure such that said restraint structure is movable along said posts, wherein said electromagnet, when activated for restraint, provides a magnetic force biasing said restraint structure toward said base portion.

13. The restraint system of claim 10, wherein said first and second channels each are dimensioned to receive one of a wrist, an arm, an ankle, and a leg.

14. The restraint system of claim 1, further comprising a switch system for selectively activating said electromagnet for restraint.

15. The restraint system of claim 14, wherein said switch system is capable of sending a wireless signal to activate said electromagnet for restraint.

16. The restraint system of claim 14, wherein said switch system is capable of sending a wireless signal to activate said electromagnet for release.

17. The restraint system of claim 14, wherein said switch system is remote from said electromagnet.

18. The restraint system of claim 1, wherein said base portion is mounted to a vehicle.

19. The restraint system of claim 18, wherein said vehicle is a law enforcement vehicle.

20. The restraint system of claim 19, wherein said vehicle is a police vehicle, a state patrol vehicle, a federal marshal vehicle, a corrections officer vehicle, or a border patrol vehicle.

21. The restraint system of claim 18, wherein said vehicle is a military vehicle.

22. The restraint system of claim 1, wherein said base portion is mounted to a wall, a countertop, a door, or an architectural surface.

23. The restraint system of claim 1, further comprising a remote control for selectively activating said electromagnet for restraint by transmitting a wireless signal, said remote control further configured for unlocking and locking the doors of a vehicle.

24. A restraint system for receiving and subsequently selectively releasing and restraining an apppendage, said restraint system comprising:
    (a) a clamp assembly including,
       (i) a base portion,
       (ii) a restraint structure opposing said base portion defining an opening for receiving an appendage between said base portion and said restraint structure, and
    (b) an electromagnet capable of being selectively activated for restraint,
    (c) wherein, when said electromagnet is not activated for restraint, said clamp assembly receives and releases an appendage,
    (d) wherein, when said electromagnet is activated for restraint, said clamp assembly restrains an appendage,
    (e) wherein said restraint structure is movable between a position proximal said base portion and a position distal said base portion,
    (f) wherein said opening is minimized when said restraint structure is at said proximal position,
    (g) wherein said opening is maximized when said restraint structure is at said distal position, and
    (h) wherein said clamp assembly further comprises a spring that biases said restraint structure toward said distal position.

25. The restraint system of claim 24, further comprising a remote control for selectively activating said electromagnet for restraint by transmitting a wireless signal, said remote control further configured for unlocking and locking the doors of a vehicle.

26. A restraint system for receiving and subsequently selectively releasing and restraining an appendage, said restraint system comprising:
   (a) a clamp assembly including,
      (i) a base portion,
      (ii) a restraint structure opposing said base portion defining an opening for receiving an appendage between said base portion and said restraint structure, and
   (b) an electromagnet capable of being selectively activated for restraint,
   (c) wherein, when said electromagnet is not activated for restraint, said clamp assembly receives and releases an appendage,
   (d) wherein, when said electromagnet is activated for restraint, said clamp assembly restrains an appendage,
   (e) wherein said restraint structure comprises,
      (i) a first channel structure opening toward said base portion for receiving a portion of a first appendage,
      (ii) a second channel structure opening toward said base portion for receiving a portion of a second appendage, and
      (iii) a center section extending between and connecting said first channel structure and said second channel structure,
   (f) wherein said clamp assembly further comprises a plurality of posts fixed to said base portion and passing through said restraint structure such that said restraint structure is movable along said posts, wherein said electromagnet, when activated for restraint, provides a magnetic force biasing said restraint structure toward said base portion, and
   (g) wherein said restraint system further comprises at least one coil spring that provides a spring force biasing said restraint structure away from said base portion, said magnetic force exceeding said spring force when said electromagnet is activated for restraint.

27. The restraint system of claim 26, further comprising a remote control for selectively activating said electromagnet for restraint by transmitting a wireless signal, said remote control further configured for unlocking and locking the doors of a vehicle.

* * * * *